(12) United States Patent
Jun et al.

(10) Patent No.: US 11,863,904 B2
(45) Date of Patent: Jan. 2, 2024

(54) ELECTRONIC DEVICE FOR PERFORMING VIDEO CALL USING FRAME RATE CONVERSION AND METHOD FOR THE SAME

(71) Applicant: Samsung Electronics Co., Ltd., Gyeonggi-do (KR)

(72) Inventors: Hyeyoung Jun, Gyeonggi-do (KR); Yongtae Kim, Gyeonggi-do (KR); Taewon Do, Gyeonggi-do (KR); Hoonjae Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/731,484

(22) Filed: Apr. 28, 2022

(65) Prior Publication Data
US 2022/0400227 A1 Dec. 15, 2022

Related U.S. Application Data

(63) Continuation of application No. PCT/KR2022/005216, filed on Apr. 11, 2022.

(30) Foreign Application Priority Data

Jun. 14, 2021 (KR) ........................ 10-2021-0076836

(51) Int. Cl.
*H04N 7/01* (2006.01)
(52) U.S. Cl.
CPC ................................ *H04N 7/0127* (2013.01)

(58) Field of Classification Search
CPC ......... H04N 7/0127; H04N 21/440281; H04N 7/147; H04N 21/44209; H04N 21/4424
(Continued)

(56) References Cited

U.S. PATENT DOCUMENTS 7,075,988 B2 7/2006 Lee et al.
8,320,747 B2 11/2012 Ushiki
(Continued)

FOREIGN PATENT DOCUMENTS

JP 2004-177575 A 6/2004
JP 2004177575 A * 6/2004
(Continued)

OTHER PUBLICATIONS

International Search Report dated Jul. 19, 2022.

*Primary Examiner* — Melur Ramakrishnaiah
(74) *Attorney, Agent, or Firm* — Cha & Reiter, LLC

(57) ABSTRACT

Disclosed are an electronic device and an operation method of the electronic device, and the electronic device may include a communication circuit configured to transmit or receive data using a call channel established via a call connection with an external electronic device, and a processor, wherein the processor is configured to receive at least some packets of a first plurality of packets of a first frame via the call channel, to identify whether a lost packet is present in the first plurality of packets of the first frame, and to determine, based on the result of the identification, whether to perform frame rate conversion (FRC) based on the first frame and a second frame corresponding to a second plurality of packets received after the reception of the at least some packets. In addition, various other embodiments are possible.

17 Claims, 13 Drawing Sheets

(58) Field of Classification Search
USPC .......................................... 348/14.01–14.16
See application file for complete search history.

(56) References Cited

U.S. PATENT DOCUMENTS

| | | | |
|---|---|---|---|
| 8,660,175 | B2 | 2/2014 | Dane et al. |
| 10,306,179 | B2* | 5/2019 | Byun .................... H04N 7/0125 |
| 10,455,194 | B1* | 10/2019 | Yang ........................ H04N 7/15 |
| 11,109,033 | B2 | 8/2021 | Byun et al. |
| 2007/0091204 | A1 | 4/2007 | Koshimizu et al. |
| 2007/0200838 | A1 | 8/2007 | Lee et al. |
| 2016/0182853 | A1* | 6/2016 | Liang .................... H04N 7/0127 |
| | | | 348/441 |
| 2021/0112439 | A1 | 4/2021 | Leung |

FOREIGN PATENT DOCUMENTS

| | | |
|---|---|---|
| JP | 2012-16031 A | 1/2012 |
| KR | 10-0396558 B1 | 9/2003 |
| KR | 10-2007-0043618 A | 4/2007 |
| KR | 10-0766085 B1 | 10/2007 |
| KR | 10-2009-0051933 A | 5/2009 |
| KR | 10-1268990 B1 | 5/2013 |
| KR | 10-1597768 B1 | 2/2016 |
| KR | 10-2016-0074646 A | 6/2016 |
| KR | 10-2018-0069576 A | 6/2018 |
| KR | 10-2020-0060589 A | 6/2020 |
| KR | 10-2022-0083690 A | 6/2022 |

* cited by examiner

ELECTRONIC DEVICE FOR PERFORMING VIDEO CALL USING FRAME RATE CONVERSION AND METHOD FOR THE SAME

CROSS-REFERENCE TO RELATED APPLICATION(S)

This application is a Continuation of and claims priority under 35 U.S.C. § 120 to PCT International Application No. PCT/KR2022/005216, which was filed on Apr. 11, 2022 and claims priority to Korean Patent Application No. 10-2021-0076836, filed on Jun. 14, 2021, in the Korean Intellectual Property Office, the disclosure of which are incorporated by reference herein their entirety.

BACKGROUND

Technical Field

One or more embodiments of the instant disclosure generally relate to an electronic device and an operation method of the electronic device, and more particularly, to transmitting or receiving content using a filter selected based on the state of a call channel.

Description of Related Art

Various electronic devices, such as smart phones, tablet PCs, portable multimedia players (PMI's), personal digital assistants (PDAs), laptop personal computer (laptop PCs), wearable devices, and the like, have become popular. Recently, such electronic devices may provide video calls based on IP multimedia subsystem (IMS) or rich communication suite (RCS).

As referred to above, in a video call, audio and video are transmitted from the counterparty of the video call in real time. The video call may use a bit rate lower than other communication schemes due to real-time bandwidth constraints. By using a relatively low bitrate, the quality of images transmitted and/or received during the video call may be low.

SUMMARY

An electronic device may transmit and/or receive low quality images during real time video calls. Therefore, in order to increase the quality of image data transmitted and/or received during the video calls, the quality of the images may be increased by employing post-processing of the received images.

There are various schemes for increasing the quality of the images, and in particular frame rate conversion (FRC) may be a scheme that converts the number of frames displayed during a predetermined period of time. In employing frame rate conversion, the electronic device may produce, based on the characteristic of frames included in the received images, a new frame to be displayed between frames. The electronic device may improve image quality of the video call by using frame rate conversion.

When network quality during the video call deteriorates, the electronic device may fail to receive some image frames. The electronic device may perform FRC between two consecutive frames having a large time interval therebetween, and may display a low quality frame generated via FRC.

In addition, when network quality fluctuates, the electronic device may receive a lot of packets corresponding to a plurality of frames within a relatively short time period. For example, in the situation in which the quality of the network used for the video calls suddenly improves after a period of poor quality, the electronic device may receive a lot of packets corresponding to a plurality of frames within a relatively short time period. When receiving a large number of frames within a relatively short time period, the electronic device may produce a new frame via FRC using the plurality of received frames. If the number of received frames and produced frames is large, the electronic device may not display all the frames due to restriction of the performance of the display.

An electronic device according to an embodiment of the disclosure may include a communication circuit configured to transmit or receive data using a call channel established via a call connection with an external electronic device; and a processor, wherein the processor is configured to receive at least some packets of a first plurality of packets of a first frame via the call channel, to identify whether a lost packet is present in the first plurality of packets of the first frame, and to determine, based on a result of the identification, whether to perform frame rate conversion (FRC) based on the first frame and a second frame corresponding to a second plurality of packets received after the reception of the at least some packets.

An electronic device according to an embodiment of the disclosure may include a display; a communication circuit configured to transmit or receive data using a call channel established via a call connection with an external electronic device; and a processor, wherein the processor is configured to receive a plurality of frames via the call channel, to identify a time interval between the plurality of frames and frames to be produced by performing frame rate conversion (FRC) based on the plurality of frames, and to determine whether to perform FRC based on the time interval and a performance of the display.

An operation method of an electronic device according to an embodiment of the disclosure may include receiving a plurality of frames via a call channel established via a call connection with an external electronic device; identifying a time interval between the plurality of frames and frames to be produced by performing frame rate conversion (FRC) based on the plurality of frames; and determining whether to perform the FRC based on the time interval and a performance of a display of the electronic device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference signs.

DETAILED DESCRIPTION

According to certain embodiments of the disclosure, there is provided an electronic device and an operation method of the electronic device which can stop performing FRC when reception of some packets in a plurality of packets corresponding to a frame fails. Therefore, the electronic device can prevent deterioration of video call quality caused by FRC operation and can decrease the amount of power unnecessarily consumed.

According to certain embodiments of the disclosure, there is provided an electronic device and an operation method of the electronic device which can identify the time interval between a received frame and a frame to be produced by FRC, and may determine whether to perform FRC based on the time interval and the performance of the display. Therefore, the electronic device can prevent FRC from being unnecessarily performed when the electronic device is incapable of displaying all the produced frame and the received frame, and thus, may reduce the amount of power unnecessarily consumed.

Figure 1:
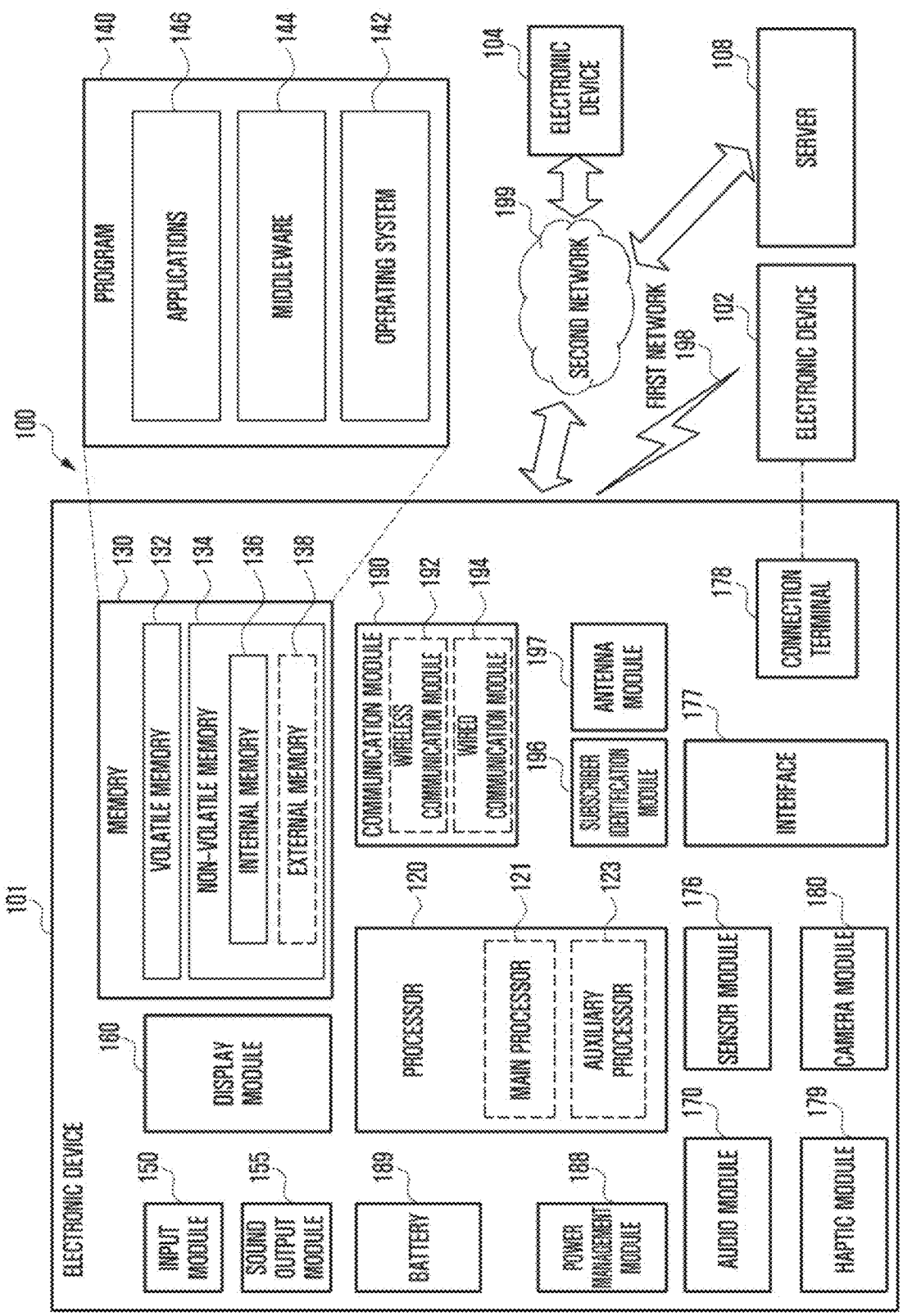
FIG. 1 is a block diagram of an electronic device according to an embodiment of the disclosure.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
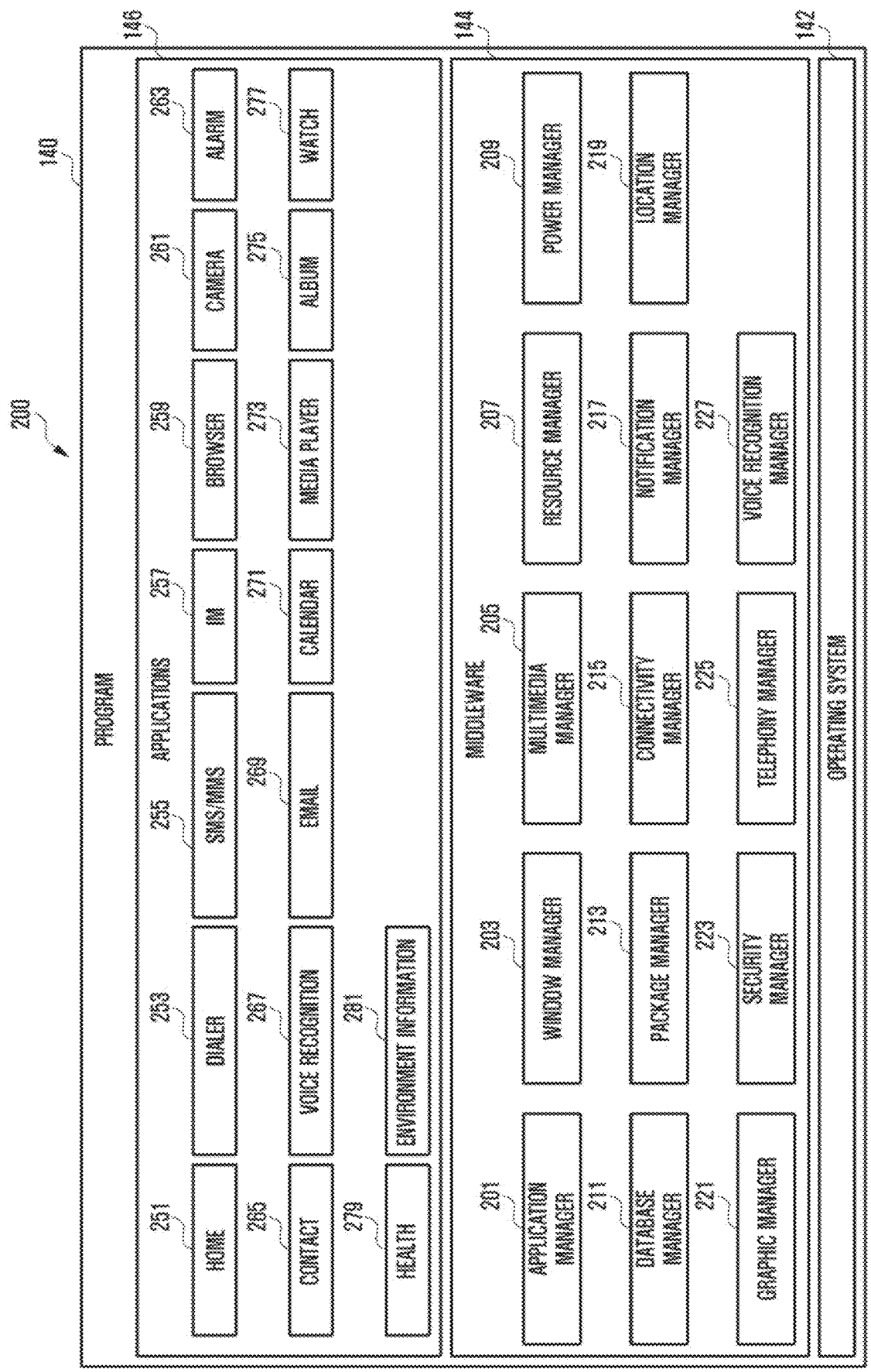
FIG. 2 is a block diagram of a program according to an embodiment.

FIG. 2 is a block diagram 200 illustrating the program 140 according to an embodiment. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
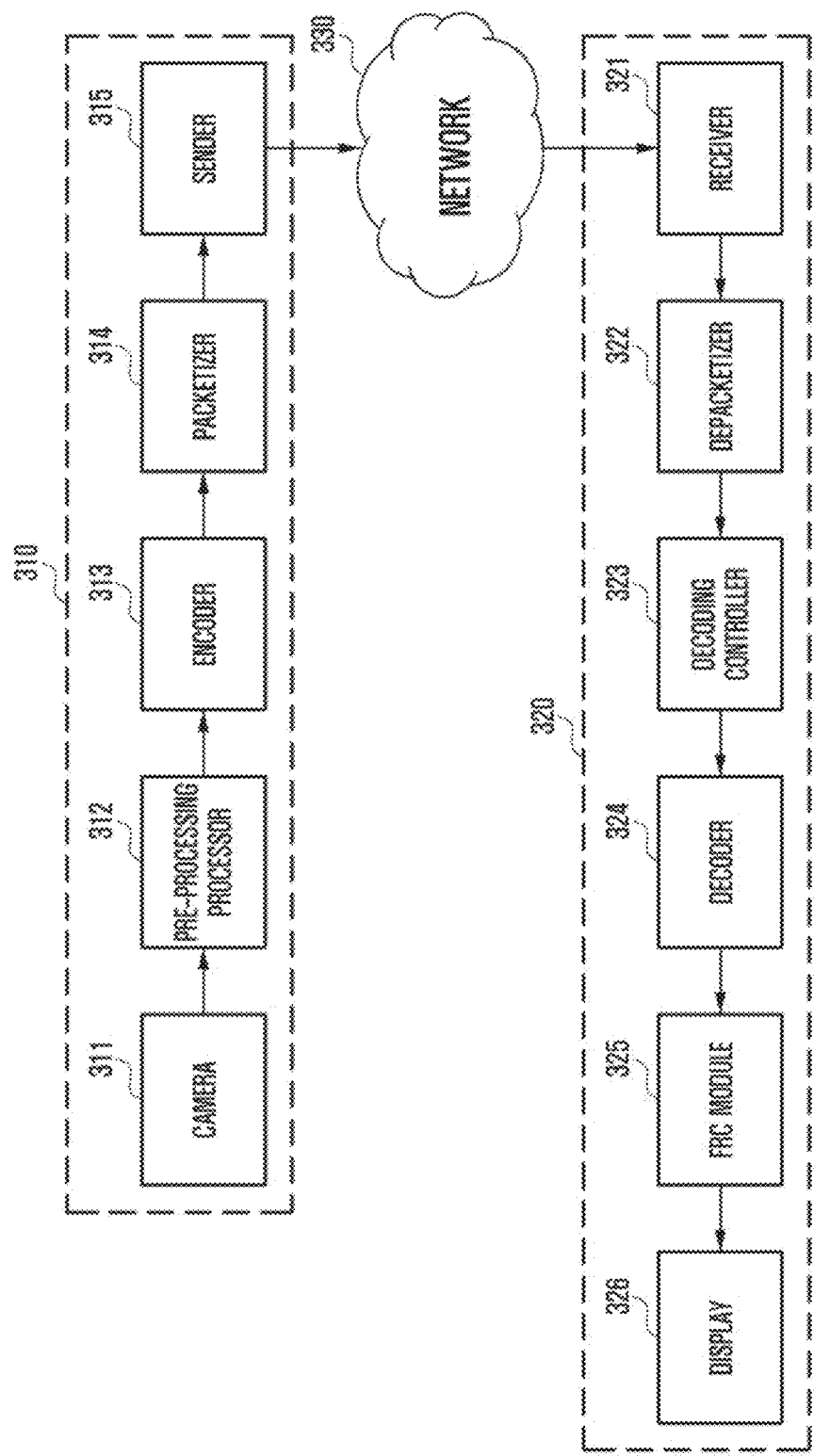
FIG. 3 is a block diagram associated with an embodiment in which a first electronic device and a second electronic device transmit or receive sound or image content according to an embodiment of the disclosure.

FIG. 3 is a block diagram of an embodiment in which a first electronic device and a second electronic device transmit or receive sound or image content according to an embodiment of the disclosure.

According to an embodiment of the disclosure, a first electronic device 310 (e.g., the electronic device 101 of FIG. 1) and a second electronic device 320 (e.g., the electronic device 101 of FIG. 1) may perform a video call of a particular scheme (e.g., IP multimedia subsystem (IMS) or rich communication suit (RCS)). For ease of description, the first electronic device 310 is referred to herein as the sender terminal and the second electronic device 320 is referred to herein as the receiver terminal. The first electronic device 310 and the second electronic device 320 may proceed with mutual negotiation using a scheme defined in a session description protocol (SDP), in order to determine the bitrate, the compression format (codec), or the quality of sound and image data (e.g. various variables that represent the quality of sound data or image data such as resolution) transmitted or received when the call is connected. Thus, the first electronic device 310 and the second electronic device 320 may determine the characteristic of image data to be transmitted via mutual negotiation, and may transmit or receive image data using the determined characteristic.

According to an embodiment of the disclosure, the first electronic device 310 may include a camera 311 (e.g., the camera module 180 of FIG. 1) that captures images so as to obtain image data including at least one frame, a pre-processor 312 (e.g., the processor 120 of FIG. 1 or a processor included in the camera module 180 of FIG. 1) that performs pre-processing on the image data obtained by the camera 311, an encoder 313 (e.g., the processor 120 of FIG. 1) that encodes image data in order to compress pre-processed image data, a packetizer 314 (e.g., the processor 120 of FIG. 1) that converts encoded image data into image packet data in the form of packets, and a sender 315 (e.g., the communication module 190 of FIG. 1) that transmits image packet data.

According to an embodiment of the disclosure, the second electronic device 320 may include a receiver 321 (e.g., the communication module 190 of FIG. 1) that receives image data packet via a network 330, a depacketizer 322 (e.g., the processor 120 of FIG. 1) that converts the image data packet into encoded image data, a decoder 324 (e.g., the processor 120 of FIG. 1) that decodes encoded image data obtained from the depacketizer 322, so as to produce one or more image frames, a decoding controller 323 (e.g., the processor 120 of FIG. 1) that controls decoding time in order to smoothly output the images, an FRC module 325 (e.g., the processor 120 of FIG. 1) that performs frame rate conversion (FRC) based on a plurality of frames produced by the decoder 324, and/or a display 326 (e.g., the display module 160 of FIG. 1) that displays one or more received frames and one or more frames produced by the FRC module 325.

According to an embodiment of the disclosure, the FRC module 325 may perform frame rate conversion (FRC), which converts the number of frames (e.g., 30 frames) displayed during a predetermined period of time (e.g., 1 second). Based on the characteristics of an object (e.g., the size of the object, the direction in which the object moves, etc.) included in temporally adjacent frames (e.g., a first frame and a second frame to be displayed after the first frame), the FRC module 325 may produce a third frame to be inserted between the two temporally adjacent frames. The second electronic device 320 may sequentially display the first frame, the third frame, and/or the second frame. In the above-described manner, the FRC module 325 may increase the frame rate determined via negotiation performed between the first electronic device 310 and the second electronic device 320. The FRC module 325 may be implemented as software executed by the processor 120. In this instance, the operation of the FRC module 325 may be understood as operation of the processor 120. Alternatively, the FRC module 325 may be implemented as specialized hardware that is separate from the processor 120.

According to an embodiment of the disclosure, the second electronic device 320 may fail to receive packets corresponding to some frames as network quality changes during the video call. For example, the second electronic device 320 may fail to receive the second frame that is temporally adjacent to a first frame after receiving the first frame, and may receive a third frame that is temporally adjacent to the second frame. The second electronic device 320 may produce a new frame using the first frame and the third frame using FRC. Given the fact that the first frame and the third frame are not temporally adjacent frames, the newly produced frame may have low quality. If the second electronic device 320 displays the low-quality frame, the quality of the video call may decrease.

According to an embodiment of the disclosure, the second electronic device 320 may receive a lot of packets corresponding to a plurality of frames within a short time as the network quality changes during the video call. For example, when network quality used for the video call improves after a period of poor network quality, the second electronic device 320 may receive a lot of packets corresponding to a plurality of frames within a relatively short time upon improvement in network quality. When receiving a large number of frames within a relatively short time, the second electronic device 320 may produce a new frame using the plurality of received frames by employing FRC. Not all the received frames and the produced frames may be displayed within the predetermined period of time due to the performance of the display 326. For example, if the time interval for the received frames and the produced frames is less than the minimum scene change time (e.g., 1/scanning rate) of the display, not all the received frames and the produced frame may be displayed within a predetermined period of time (e.g., the minimum scene change time).

Figure 4:
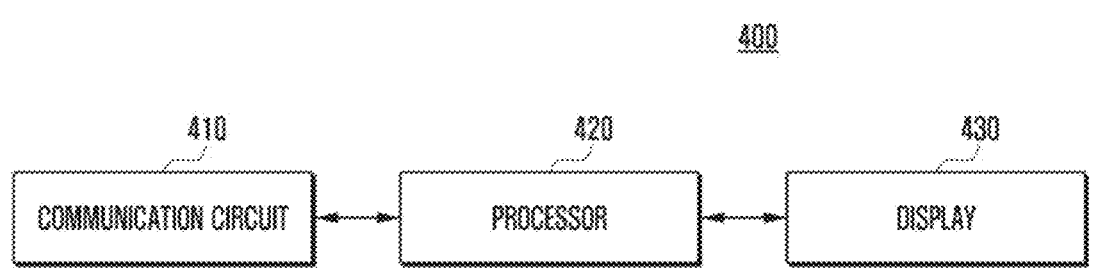
FIG. 4 is a block diagram of an electronic device according to an embodiment of the disclosure.

FIG. 4 is a block diagram of an electronic device according to an embodiment of the disclosure.

Hereinafter, for ease of description, description will be provided on the assumption that the electronic device 400 is the receiver terminal (e.g., the second electronic device 320 of FIG. 3) and an external electronic device is the sender terminal (e.g., the first electronic device 310 of FIG. 3).

According to an embodiment of the disclosure, the electronic device 400 (e.g., the electronic device 101 of FIG. 1 or the second electronic device 320 of FIG. 3) may include a communication circuit 410 (e.g., the wireless communication module 192 of FIG. 1), a processor 420 (e.g., the processor 120 of FIG. 1), and/or a display 430 (e.g., the display module 160 of FIG. 1). The processor 420 may be any one of the main processor 121 or the sub-processor 123 of FIG. 1. If the processor 420 is the sub-processor 123, the processor 420 may be a graphic processing unit (GPU) or a neural processing unit (NPU). Further, the processor 420 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment of the disclosure, the communication circuit 410 may transmit sound data or image data using a call channel (e.g., a cellular communication channel) established via a call connection with an external electronic device (e.g., the second electronic device 320 of FIGS. 3A and 3B). In one non-limiting embodiment, the communication circuit 410 may receive sound data or image data from an external electronic device (e.g., the first electronic device 310 of FIG. 3), and may perform transmission or reception of control messages (e.g., an SDP message) with the external electronic device 310.

According to an embodiment of the disclosure, the processor 420 may render at least one frame (e.g., first frame and/or second frame) received via the call channel, and may display the rendered frame(s) on the display 430. The processor 420 may include a renderer that performs rendering of frames. The processor 420 may use the renderer so as to perform rendering of decoded frames, and may display the rendered frames on the display 430.

According to an embodiment of the disclosure, the processor 420 may include an FRC module (e.g., the FRC module 325 of FIG. 3) that performs frame rate conversion (FRC). The processor 420 may control the FRC module 325 so as to produce a third frame to be displayed between the first frame and the second frame. The FRC may be done using the first frame and the second frame that is adjacent (e.g. temporally adjacent) to the first frame. The processor 420 may sequentially display the first frame, the third frame, and/or the second frame, so as to display video having a frame rate higher than the negotiated frame rate. For example, if receiving N frames from the external electronic device 310, the processor 420 may control the FRC module 325 so as to produce N−1 frames. The processor 420 may sequentially display the received N frames and the produced N−1 frames.

According to an embodiment of the disclosure, the processor 420 may receive, via the call channel, at least some packets of a plurality of packets of the first frame. For example, the external electronic device 310 may transmit N packets of the first frame to the electronic device 400 via the call channel. The electronic device 400 may receive at least one packet of the N packets of the first frame via the communication circuit 410.

According to an embodiment of the disclosure, the processor 420 may identify whether one or more packets in the plurality of packets of the first frame are lost. According to an embodiment, the processor 420 may identify whether a lost packet is present by identifying a sequence number assigned to each of the received packets. The lost packet may be a packet that has not been received or a packet that cannot be decoded even if the packet is received.

According to an embodiment of the disclosure, based on a result of identifying whether a lost packet, the processor 420 may determine whether to perform FRC that uses the first frame and a second frame corresponding to a plurality of packets received after receiving at least some packets.

Based on the identifying that a lost packet is present in the plurality of packets, the processor 420 may determine not to perform FRC that uses the first frame and the second frame. If there is a lost packet in the plurality of packets, the first frame may be a faulty frame. An FRC-generated frame that is produced using a faulty frame may have low quality. Based on the identifying that there is a lost packet in the plurality of packets for the first frame, the processor 420 may not perform the FRC that uses the first frame and the second frame, may prevent deterioration of the quality of the video call caused by the FRC operation, and may reduce the amount of power unnecessarily consumed.

Based on the identifying that a lost packet is present in the plurality of packets, the processor 420 may control the display 430 so as to display the received first frame or another frame received before the first frame, until the second frame is received. The processor 420 may display the second frame after receiving, decoding, and rendering the second frame.

Alternatively, based on the identifying that a lost packet is present in the plurality of packets, the processor 420 may still control the FRC module 325 so as to produce a third frame by performing FRC that uses the first frame and the second frame. The processor 420 may control the display 430 so as to sequentially display the first frame, the third frame, and/or the second frame.

When a lost packet is not present in the plurality of packets, the processor 420 may not perform, based on the state of the electronic device 101, FRC that uses the first frame and the second frame. Alternatively, based on the state of the electronic device 101, the processor 420 may stop FRC that uses the first frame and the second frame. According to an embodiment, based on the fact that the temperature of the electronic device 101 is greater than or equal to (or exceeds) a designated value, the processor 420 may not perform FRC that uses the first frame and the second frame. According to an embodiment, based on the fact that the residual power of the battery of the electronic device 101 is less than or equal to (or less) a designated value, the processor 420 may not perform FRC that uses the first frame and the second frame.

According to an embodiment of the disclosure, the processor 420 may receive packets corresponding to a plurality of frames that the external electronic device 310 transmits via a call channel. After receiving packets, the processor 420 may control a depacketizer (e.g., the depacketizer 322 of FIG. 3) so as to convert the received packets into a plurality of frames.

According to an embodiment of the disclosure, when performing FRC, the processor 420 may receive a plurality of packets in short intervals based on one of various factors (e.g., when network quality of the network 330 improves after a period of poor network quality). For example, when the network quality for the video call improves, the processor 420 may receive a lot of packets corresponding to a plurality of frames within a relatively short time period. If the electronic device 400 receives a plurality of packets in short intervals, the electronic device 400 may display relatively lots of frames within a designated period of time. The processor 420 may perform FRC by inputting received frames into the FRC module 325. In this instance, the display 430 may display a larger number of frames, larger than the maximum number of frames that the display 430 is capable of displaying within the designated period of time.

The processor 420 may identify the time interval between received frames and/or frames to be produced by the FRC module 325, before inputting, into the FRC module 325, the frames obtained from the depacketizer. For example, given the situation of displaying 119 frames per second in the state in which the number of frames that the electronic device 400 receives is 60, and the number of frames to be produced by the FRC module 325 is 59, the time interval between 119 frames may be 8.4 ms (1000/119 sec) (or 119 fps).

According to an embodiment of the disclosure, based on the identified time interval and the performance of the display, the processor 420 may determine whether to perform FRC on the received frames. The performance of the display 430 may include the scanning rate of the display 430. According to an embodiment, based on the performance of the display 430, the processor 420 may identify whether the display 430 is capable of displaying all the received frames and the FRC frames. If the scanning rate of the display 430 is 120 Hz, the display 430 may display 120 frames per second, and the display 430 may display one frame per 8.3 ms. If the scanning rate of the display 430 is 60 Hz, the display 430 may display 60 frames per second, and the display 430 may display one frame per 16.6 ms.

When the time interval between received frames is greater than the interval corresponding to the scanning rate (or the minimum time during which one frame is capable of being displayed), and the processor 420 may determine to perform FRC on the received frames. By determining to perform FRC, the processor 420 may control the display 430 so as to display all the received frames and the frames produced by the FRC module 325.

If performance of the display 430 is lower than the performance needed to display all the received frames and the FRC frames to be produced by the FRC module, the electronic device 400 may not need to perform FRC. When the time interval between received frames is less than the interval corresponding to the scanning rate (or the minimum time during which one frame is capable of being displayed), and the processor 420 may determine not to perform FRC on the received frames. By determining not to perform FRC, the processor 420 may control the display 430 to display only the received frames.

According to an embodiment of the disclosure, when FRC is not performed, the processor 420 may identify whether the time interval between the received frames and frames to be produced via FRC has changed to be greater than the interval corresponding to the scanning rate, and may control the FRC module 325 to perform FRC again based on the result of the identification. For example, the processor 420 may identify that the time interval between the received frames and frames to be produced via FRC changes to be greater than the interval corresponding to the scanning rate, and may control the FRC module 325 to perform FRC using the received frames.

According to an embodiment of the disclosure, the processor 420 may determine whether to perform FRC by taking into consideration of the period of time to be spent in producing a FRC frame. For example, based on the fact that the period of time to be spent in producing a FRC frame is greater than or equal to a designated period of time, the processor 420 may determine not to perform FRC. Based on the fact that the time to be spent in producing a FRC frame is less than or equal to (or less than) a designated period of time, the processor 420 may determine to perform FRC, and may control the FRC module 325 to perform FRC using the received frames. The designated period of time may be set in various manners or based on various factors. For example, in the state in which the processor 420 is configured to perform displaying within a designated period of time (e.g., 100 ms) from the time at which a packet corresponding to a frame is received during a video call, the processor 420 may determine not to perform FRC based on the fact that the time spent in producing the frame is greater than or equal to (exceeds) a designated period of time. The processor 420 may identify (or expect) the period of time to be spent in producing a FRC frame, in various manners (e.g. the processor 420 may receive information regarding the period of time to be spent in producing a FRC frame from the FRC module 325 and identify the period of time based on the information regarding the period of time).

According to an embodiment of the disclosure, when FRC is performed, if it is detected that a plurality of frames has already been input to the FRC module 325 and new frames are produced, the processor 420 may control the display 430 so as to display only the frames received from the external electronic device 310, without displaying the new frames.

In another embodiment, even when the time interval between received frames is greater than the interval corresponding to the scanning rate (the minimum time during which one frame is capable of being displayed), the processor 420 may not perform FRC using a plurality of frames based on the state of the electronic device 101. Alternatively, based on the state of the electronic device 101, the processor 420 may stop performing FRC. According to an embodiment, based on the fact that the temperature of the electronic device 101 is greater than or equal to (or exceeds) a designated value, the processor 420 may not perform FRC that uses the plurality of frames. According to an embodiment, based on the fact that the residual power of the battery of the electronic device 101 is less than or equal to (or less than) a designated value, the processor 420 may not perform FRC that uses the plurality of frames.

The electronic device 400 according to certain embodiments of the disclosure may determine whether to perform FRC according to the above-described operations, and thus, may prevent the quality of a video call from deteriorating caused by unnecessary FRC, and may decrease the amount of power consumed via FRC.

Figure 5A:
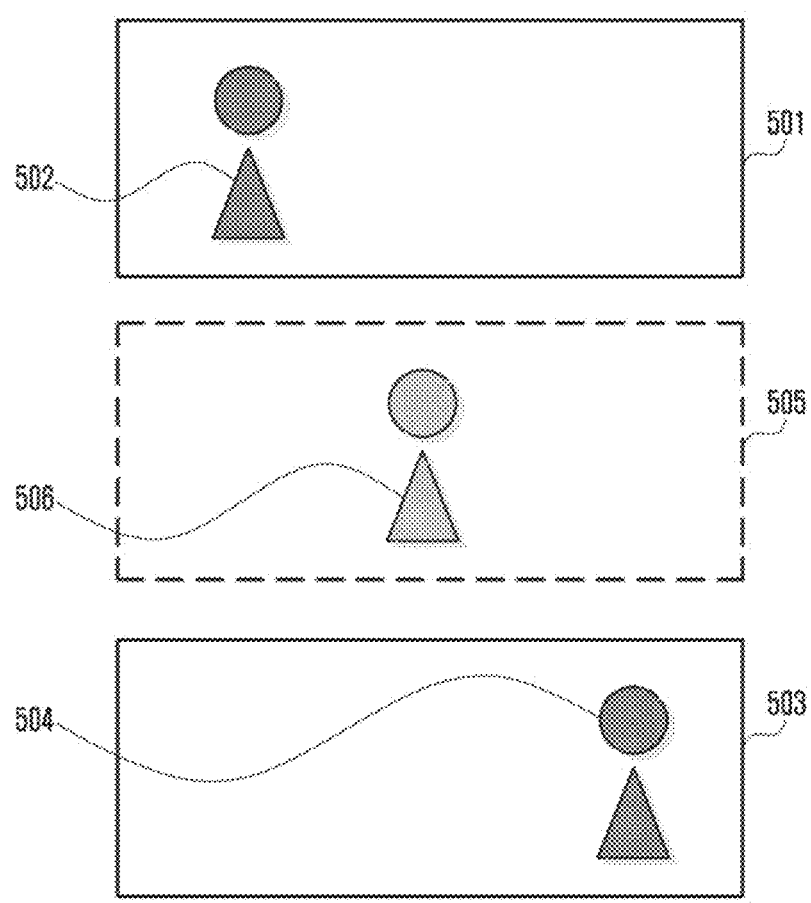
FIG. 5A is a diagram illustrating an embodiment of producing a frame via frame rate conversion (FRC), by an electronic device according to an embodiment of the disclosure.

FIG. 5A is a diagram illustrating an embodiment of producing a frame via frame rate conversion (FRC), by an electronic device according to an embodiment of the disclosure.

Referring to FIG. 5A, an electronic device (e.g., the electronic device 400 of FIG. 4) may sequentially receive packets corresponding to a first frame 501 and packets corresponding to a second frame 503. The electronic device 400 may control a depacketizer (e.g., the depacketizer 322 of FIG. 3) and a decoder (e.g., the decoder 324 of FIG. 3) so as to convert the packets corresponding to the first frame 501 into the first frame 501. The electronic device 400 may control the depacketizer 322 and the decoder 324 so as to convert the packets corresponding to the second frame 503 into the second frame 503.

According to an embodiment of the disclosure, the electronic device 400 may control the decoder 324 so as to input the first frame 501 and the second frame 503 into the FRC module 325. The FRC module 325 may extract the motion vector of objects 502 and 504 based on the location of the object 502 in the first frame 501 and the location of the object 504 in the second frame 503, and may produce, based on the extracted motion vector, a third frame 505 to be displayed between the first frame 501 and the second frame 503. The FRC module 325 may determine, based on the extracted motion vector, the location of an object 506 in the third frame 505.

Figure 5B:
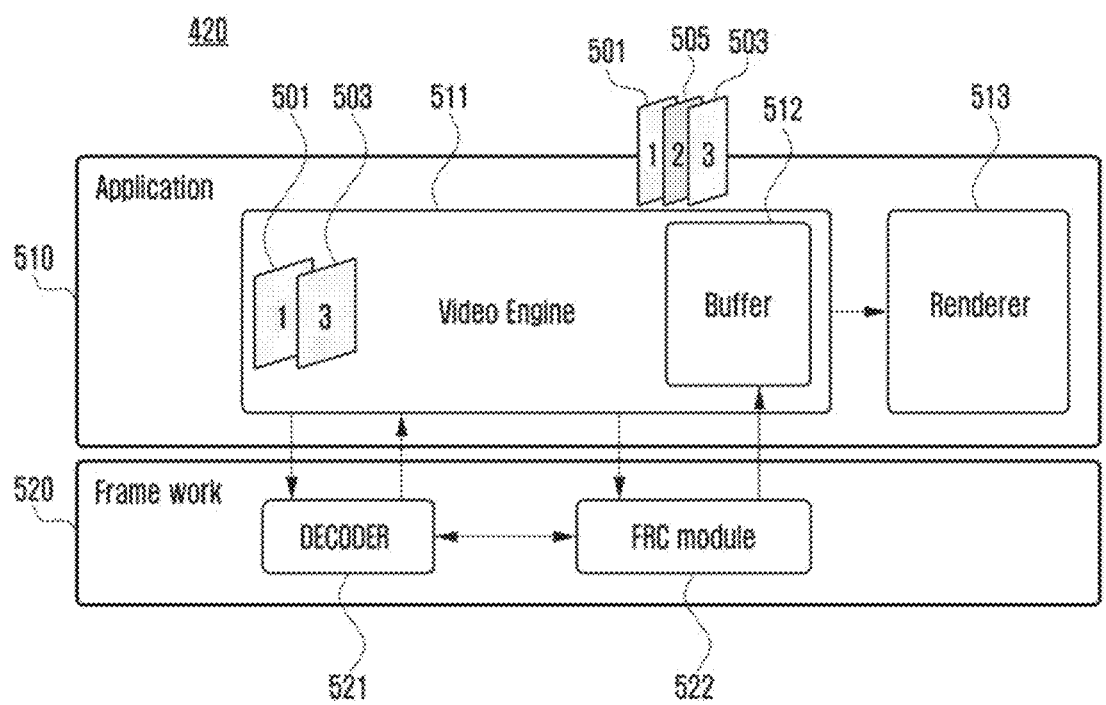
FIG. 5B is a block diagram of a processor of an electronic device executing one or more pieces of software according to an embodiment of the disclosure.

FIG. 5B is a block diagram of a processor of an electronic device executing one or more pieces of software according to an embodiment of the disclosure.

According to an embodiment of the disclosure, a processor (e.g., the processor 420 of FIG. 4) of an electronic device (e.g., the electronic device 400 of FIG. 4) may include an application layer 510 that executes a predetermined function and/or a framework layer 520 that provides an application programming interface (API) to be used by various programs included in the application layer 510.

According to an embodiment of the disclosure, the framework layer 520 may include a decoder 521 (e.g., the decoder 324 of FIG. 3) that decodes encoded frames and/or an FRC module 522 (e.g., the FRC module 325 of FIG. 3) that produces frames to be displayed between the decoded frames which are decoded by the decoder 521.

According to an embodiment of the disclosure, the application layer 510 may include a video engine 511 that performs functions related to the frames to be displayed and/or a renderer 513 that renders frames transmitted from the video engine 511 and transmits the rendered data to a display (e.g., the display 430 of FIG. 4).

According to an embodiment of the disclosure, the video engine 511 may transmit the encoded frames 501 and 503 to the decoder 521 in order to decode the encoded frames 501 and 503 received from a depacketizer (e.g., the depacketizer 322 of FIG. 3). The decoder 521 may decode the encoded frames 501 and 503, and may transmit the decoded frames 501 and 503 to the FRC module 522. Using the frames 501 and 503 received from the decoder 521, the FRC module 522 may produce the new frame 505 to be displayed between the frames 501 and 503. A detailed example of producing the new frame 505 has been described with reference to FIG. 5A. The FRC module 522 may transmit the received frames 501 and 503 and the produced frame 505 to a buffer 512. The video engine 511 may transmit, to the renderer 513, the frames 501, 503, and 505 stored in the buffer 512. The renderer 513 may perform rendering that converts the received frames 501, 503, and 505 into data suitable for the display 430, and may transmit the rendered data to the display 430.

According to an embodiment of the disclosure, the processor 420 (or the depacketizer 322) may identify the time interval between the received frames 501 and 503 and the frame 505 to be produced, and may control the FRC module 522 based on the time interval and the performance of the display 430. Based on the fact that the time interval between the frames 501, 503, and 505 is less than the period of time (e.g., 1/scanning rate) spent when the display 430 converts a frame, the processor 420 may control the FRC module 522 so as not to perform an FRC operation that uses the frames 501 and 503. In this instance, the frames 501 and 503 decoded by the decoder 521 may bypass the FRC module 522 and may be directly transmitted to the buffer 512.

Figure 6:
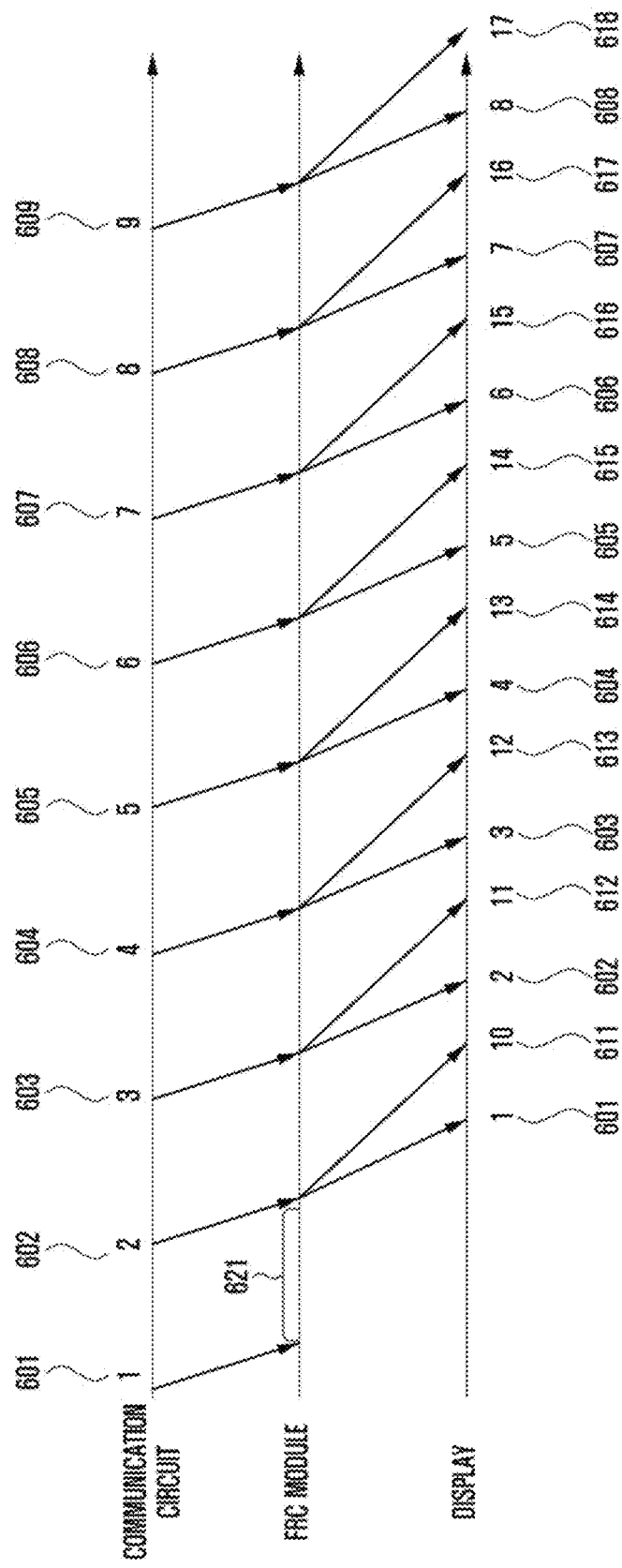
FIG. 6 is a diagram illustrating an embodiment of displaying a received frame and a frame produced via FRC, by an electronic device according to an embodiment of the disclosure.

FIG. 6 is a diagram illustrating an embodiment of displaying a received frame and a frame produced via FRC, by an electronic device according to an embodiment of the disclosure.

According to an embodiment of the disclosure, a communication circuit (e.g., the communication circuit 410 of FIG. 4) of an electronic device (e.g., the electronic device 400 of FIG. 4) may receive packets corresponding to a plurality of frames 601, 602, 603, 604, 605, 606, 607, 608, and 609 including the first frame 601, the second frame 602, the third frame 603, the fourth frame 604, the fifth frame 605, the sixth frame 606, the seventh frame 607, the eighth frame 608, and/or the ninth frame 609, from an external electronic device (e.g., the first electronic device 310 of FIG. 3) via a call channel. The electronic device 400 may extract encoded frames 601, 602, 603, 604, 605, 606, 607, 608, and 609 from the received packets, may decode the encoded frames 601, 602, 603, 604, 605, 606, 607, 608, and 609, and may transmit the decoded frames 601, 602, 603, 604, 605, 606, 607, 608, and 609 to an FRC module (e.g., the FRC module 325 of FIG. 3).

According to an embodiment of the disclosure, the FRC module 325 may receive the decoded frames 601, 602, 603, 604, 605, 606, 607, 608, and 609, and may produce frames 611, 612, 613, 614, 615, 616, 617, and 618 to be displayed in between the received frames. The FRC module 325 may receive the first frame 601, and may not transmit the first frame 601 to the display 430 until receiving the second frame 602 as shown in diagram 621.

According to an embodiment of the disclosure, the FRC module 325 may produce the tenth frame 611 to be displayed between the first frame 601 and the second frame 602, may produce the eleventh frame 612 to be displayed between the second frame 602 and the third frame 603, may produce the twelfth frame 613 to be displayed between the third frame 603 and the fourth frame 604, may produce the thirteenth frame 614 to be displayed between the fourth frame 604 and the fifth frame 605, may produce the fourteenth frame 615 to be displayed between the fifth frame 605 and the sixth frame 606, may produce the fifteenth frame 616 to be displayed between the sixth frame 606 and the seventh frame 607, may produce the sixteenth frame 617 to be displayed between the seventh frame 607 and the eighth frame 608, and/or may produce the seventeenth frame 618 to be displayed between the eighth frame 608 and the ninth frame 609.

According to an embodiment of the disclosure, the electronic device 400 may control the display 430 so as to display the received frames 601, 602, 603, 604, 605, 606, 607, 608, and 609 and the produced frames 611, 612, 613, 614, 615, 616, 617, and 618 on the display 430.

The display 430 may sequentially display the first frame 601, the tenth frame 611, the second frame 602, the eleventh frame 612, the third frame 603, the twelfth frame 613, the fourth frame 604, the thirteenth frame 614, the fifth frame 605, the fourteenth frame 615, the sixth frame 606, the fifteenth frame 616, the seventh frame 607, the sixteenth frame 617, the eighth frame 608, the seventeenth frame 618, and the ninth frame 609 at designated intervals. Referring to FIG. 6, there may be an interval between the time at which a packet corresponding to the first frame 601 is received and the time at which the first frame 601 is displayed.

Figure 7:
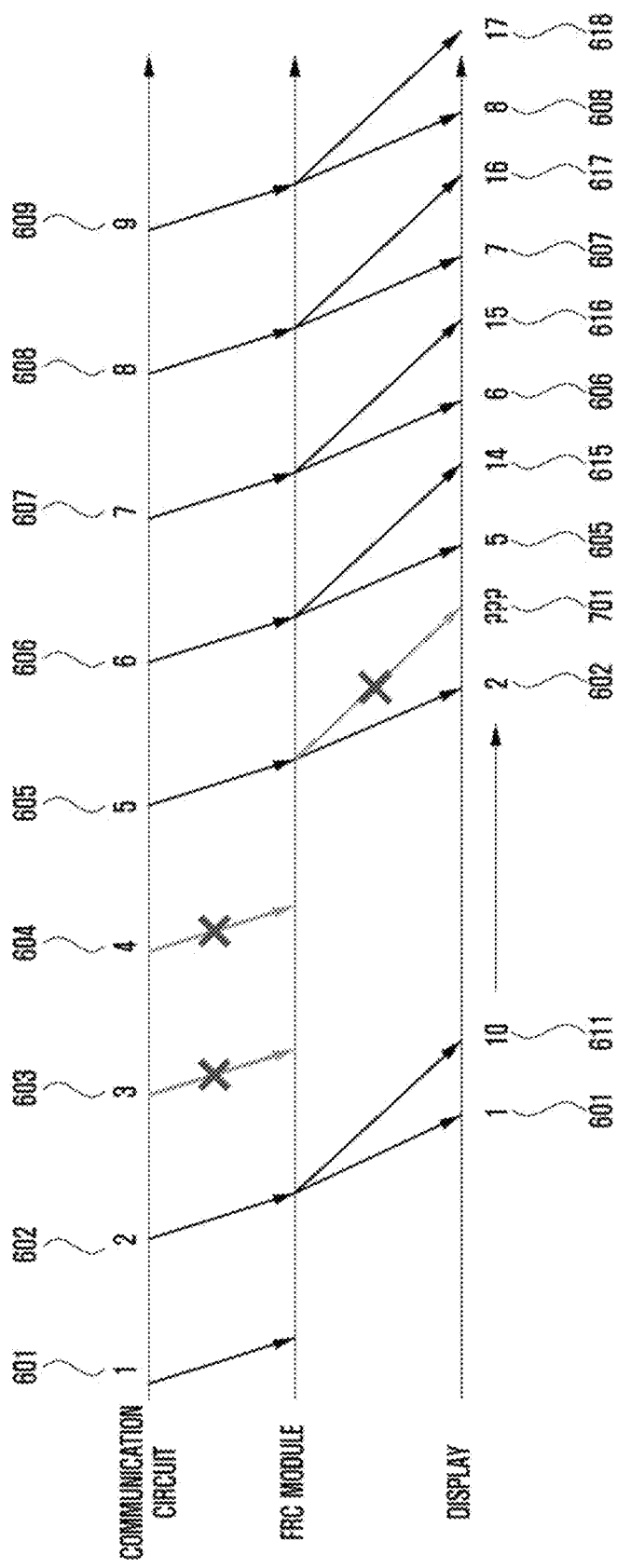
FIG. 7 is a diagram illustrating an embodiment of displaying a frame when reception of some frames fails, by an electronic device according to an embodiment of the disclosure.

FIG. 7 is a diagram illustrating an embodiment of displaying a frame when reception of some frames fails, by an electronic device according to an embodiment of the disclosure.

FIG. 7 illustrates an embodiment in which the electronic device 400 performs an operation when reception of packets corresponding to some frames (e.g., the third frame 603, the fourth frame 604) fails, in contrast with the embodiment of FIG. 6.

According to an embodiment of the disclosure, the electronic device 400 (or the processor 420) may identify that reception of packet(s) corresponding to the third frame 603 and/or the fourth frame 604 has failed, i.e. some packets are lost. The depacketizer 322 of the electronic device 400 may identify sequence numbers corresponding to received packets, and may identify that a packet of the third frame 603 and/or a packet of the fourth frame 604 having particular sequence numbers are not present, thereby identifying that reception of the packets corresponding to the third frame 603 and/or the fourth frame 604 has failed.

According to an embodiment of the disclosure, based on the result of identifying that there are lost packets, the electronic device 400 may determine whether to perform FRC that uses a previously received frame and a frame corresponding to a plurality of packets received after reception of at least some packets. For example, based on a result of identifying whether the reception of a packet is successful, the electronic device 400 may determine not to perform FRC that uses the second frame 602 and a frame (e.g., the fourth frame 604) received after the third frame 603. The electronic device 400 does not perform FRC that uses the second frame 602 and the fourth frame 604, and may not display the frame 701 that otherwise would have been produced via FRC that uses the second frame 602 and the fourth frame 604. The electronic device 400 may display the second frame 602, and may display the received fifth frame 605.

According to an embodiment of the disclosure, the electronic device 400 may maintain displaying the second frame 602 until the fifth frame 605 is received.

In the embodiment of FIG. 7, the display 430 may sequentially display the first frame 601, the tenth frame 611, the second frame 602, the fifth frame 605, the fourteenth frame 614, the sixth frame 606, the fifteenth frame 615, the seventh frame 607, the sixteenth frame 616, the eighth frame 608, the seventeenth frame 618, and the eighteenth frame 609, at designated intervals.

Figure 8:
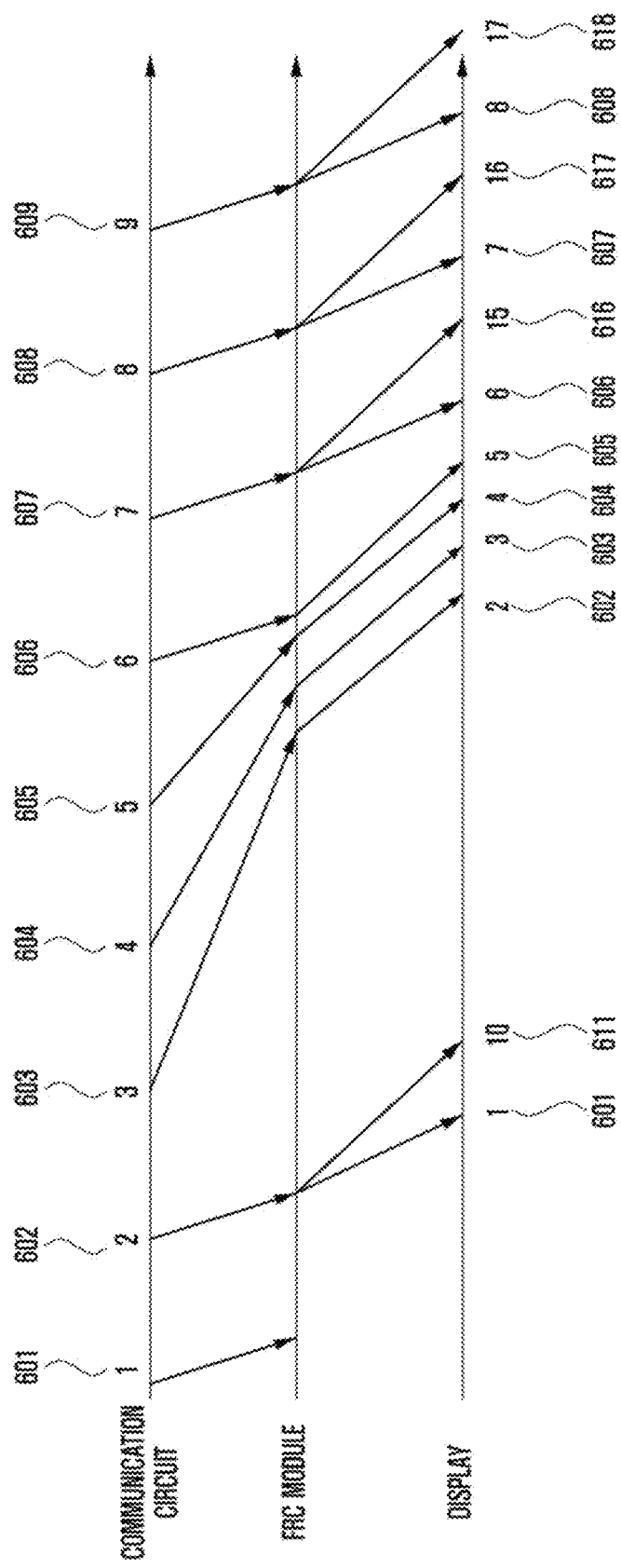
FIG. 8 is a diagram illustrating an embodiment of displaying some frames are received within an abnormally short period of time, by an electronic device according to an embodiment of the disclosure.

FIG. 8 is a diagram illustrating an embodiment of displaying a frame when some frames are received within an abnormally short period of time, by an electronic device according to an embodiment of the disclosure.

The embodiment of FIG. 8 illustrates the situation in which the electronic device 400 receives packets corresponding to a plurality of frames (e.g., the third frame 603, the fourth frame 604, the fifth frame 605, and/or the sixth frame 606) in relatively short intervals, due to conditions of the network (e.g., the network 330 of FIG. 3). If the electronic device 400 receives a plurality of packets at short intervals, the electronic device 400 may display a relatively large number of frames within a designated period of time. The electronic device 400 may perform FRC by inputting the received frames (e.g., the third frame 603, the fourth frame 604, the fifth frame 605, and/or the sixth frame 606) to the FRC module 325. In this instance, the display 430 may display a number of frames larger than the maximum number of frames that the display 430 is capable of displaying within the designated period of time.

Before inputting the received frames 603, 604, 605, and 606 to the FRC module 325, the electronic device 400 may identify the time interval between the received frames 603, 604, 605, and 606 and/or frames (e.g., the eleventh frame 612, the twelfth frame 613, the thirteenth frame 614, and the fifteenth frame 615) to be produced by the FRC module 325.

According to an embodiment of the disclosure, based on the identified time interval and the performance of the display 430, the electronic device 400 may determine whether to perform FRC on the received frames 603, 604, 605, and 606. The performance of the display 430 may include the scanning rate of the display 430. According to an embodiment, based on the performance of the display 430, the electronic device 400 may identify whether the display 430 is capable of displaying all the received frames 603, 604, 605, and 606 and the frames 612, 613, 614, and 615 to be produced by FRC.

If performance of the display 430 is lower than that is necessary to displaying all the received frames and the frames to be produced by FRC, the electronic device 400 may not need to perform FRC. The electronic device 400 may identify that the time interval is less than the interval corresponding to the scanning rate (or the minimum time during which one frame is capable of being displayed), and may determine not to perform FRC on the received frames 603, 604, 605, and 606. By determining not to perform FRC, the electronic device 400 may control the display 430 to display only the received frames 603, 604, 605, and 606.

According to other embodiments, the electronic device 400 may identify whether the number of frames to be displayed per unit time (e.g., one second) is greater than or equal to (or exceeds) a designated value, and may determine not to perform FRC on the received frames 603, 604, 605, and 606 based on the fact that the number of frames to be displayed per unit time is greater than or equal to a reference value.

In the embodiment of FIG. 8, the display 430 may sequentially display the first frame 601, the tenth frame 611, the second frame 602, the third frame 603, the fourth frame 604, the fifth frame 605, the sixth frame 606, the seventh frame 607, the sixteenth frame 617, the eighth frame 608, the seventeenth frame 618, and the eighteenth frame 609, at designated intervals.

An electronic device according to an embodiment of the disclosure may include a communication circuit configured to transmit or receive data using a call channel established via a call connection with an external electronic device; and a processor, and the processor may be configured to receive at least some packets of a first plurality of packets of a first frame via the call channel, to identify whether a lost packet is present in the first plurality of packets of the first frame, and to determine, based on a result of the identification, whether to perform frame rate conversion (FRC) based on the first frame and a second frame corresponding to a second plurality of packets received after the reception of the at least some packets.

In the electronic device according to an embodiment of the disclosure, based on the identifying that the lost packet is not present in the first plurality of packets, the processor may be configured to perform FRC based on the second frame and the first frame.

In the electronic device according to an embodiment of the disclosure, based on the identifying that the lost packet is present among the plurality of packets, the processor may be configured to refrain from performing FRC based on the second frame and the first frame.

In the electronic device according to an embodiment of the disclosure, the processor may be configured to display a frame corresponding to a packet received before the first frame until the second plurality of packets corresponding to the second frame are received.

In the electronic device according to an embodiment of the disclosure, in the state of performing the FRC, the processor may be configured to determine, based on a state of the electronic device, whether to stop the FRC.

In the electronic device according to an embodiment of the disclosure, the state of the electronic device may include the temperature of the electronic device and/or the residual capacity of a battery of the electronic device.

An electronic device according to an embodiment of the disclosure may include a display; a communication circuit configured to transmit or receive data using a call channel established via a call connection with an external electronic device; and a processor, and the processor may be configured to receive a plurality of frames via the call channel, to identify a time interval between the plurality of frames and frames to be produced by performing frame rate conversion (FRC) based on the plurality of frames, and to determine whether to perform FRC based on the time interval and a performance of the display.

In the electronic device according to an embodiment of the disclosure, the performance of the display may include the scanning rate of the display, and based on the time interval being greater than an interval corresponding to the scanning rate, the processor may be configured to perform the FRC.

In the electronic device according to an embodiment of the disclosure, based on the time interval being less than the interval corresponding to the scanning rate, the processor may be configured to refrain from performing the FRC.

In the electronic device according to an embodiment of the disclosure, while the processor is refraining from performing the FRC, the processor may be configured to start performing the FRC based on the time interval being greater than the interval corresponding to the scanning rate.

In the electronic device according to an embodiment of the disclosure, based on the time interval being less than the interval corresponding to the scanning rate, while the processor is performing the FRC, the processor may be configured to refrain from displaying at least one frame produced via the FRC.

In the electronic device according to an embodiment of the disclosure, in the state of performing the FRC, the processor may be configured to determine, based on the state of the electronic device, whether to stop performing the FRC.

In the electronic device according to an embodiment of the disclosure, the state of the electronic device may include the temperature of the electronic device and/or the residual capacity of a battery of the electronic device.

Figure 9:
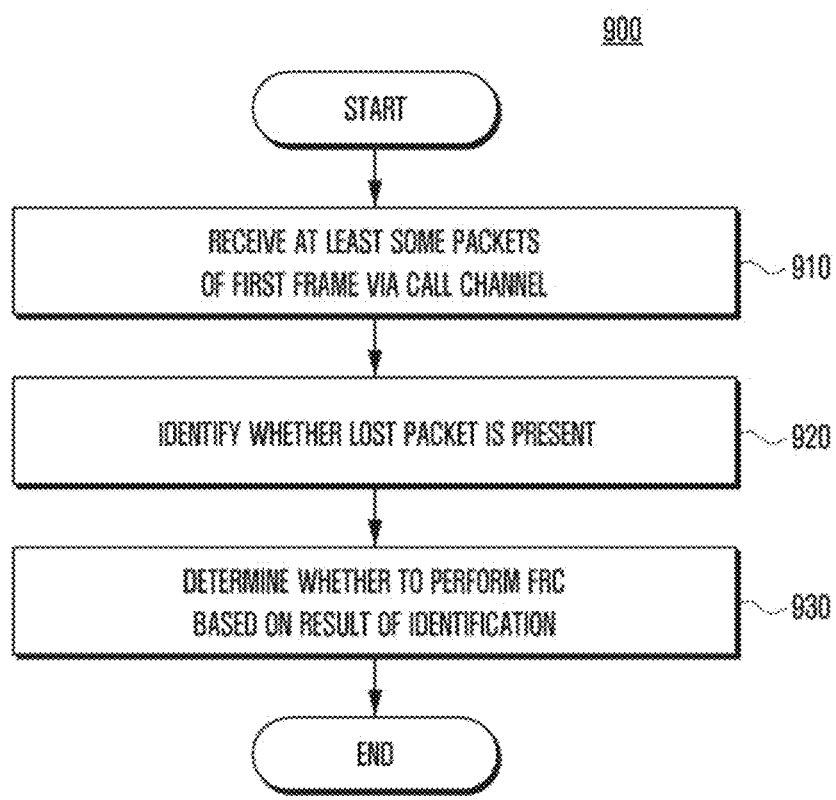
FIG. 9 is a flowchart illustrating an operation method of an electronic device according to an embodiment of the disclosure.

FIG. 9 is a flowchart illustrating an operation method 900 of an electronic device according to an embodiment.

According to an embodiment of the disclosure, an electronic device (e.g., the electronic device 400 of FIG. 4) may receive at least some packets of a first frame via a call channel in operation 910.

For example, an external electronic device (e.g., the first electronic device 310 of FIG. 3) may transmit N packets of the first frame to the electronic device 400 via the call channel. The electronic device 400 may receive at least one packet of the first frame via the communication circuit 410.

According to an embodiment of the disclosure, in operation 920, the electronic device 400 may identify whether a lost packet is present in the packets of the first frame.

According to an embodiment of the disclosure, the electronic device 400 may identify whether a lost packet is present in the plurality of packets of the first frame. According to an embodiment, the processor 420 may identify whether a lost packet is present by identifying a sequence number assigned to each of the received packets.

According to an embodiment of the disclosure, the electronic device 400 may determine whether to perform FRC based on the result of the identification in operation 930.

According to an embodiment of the disclosure, based on a result of identifying whether a lost packet is present, the electronic device 400 may determine whether to perform FRC that uses the first frame and a second frame corresponding to a plurality of packets received after reception of at least some packets.

Based on the identifying that a lost packet is present, the electronic device 400 may determine not to perform FRC that uses the first frame and the second frame. If there is a lost packet, the first frame may be a faulty frame. A frame that is produced according to an FRC scheme using a faulty frame may have low quality. Based on the identifying that a lost packet is present in the plurality of packets, the electronic device 400 may not perform FRC that uses the first frame and the second frame, thereby preventing deterioration of the quality of the video call caused by FRC operation, and reducing the amount of power unnecessarily consumed.

Based on the identifying that a lost packet is present in the plurality of packets, the electronic device 400 may control the display 430 so as to display the received first frame or another frame received before the first frame, until receiving the second frame. The electronic device 400 may display the second frame after receiving, decoding, and rendering the second frame.

Alternatively, based on the identifying that a lost packet is present in the plurality of packets, the electronic device 400 may still control the FRC module 325 so as to produce a third frame by performing FRC that uses the first frame and the second frame. The electronic device 400 may control the display 430 so as to sequentially display the first frame, the third frame, and/or the second frame.

Figure 10:
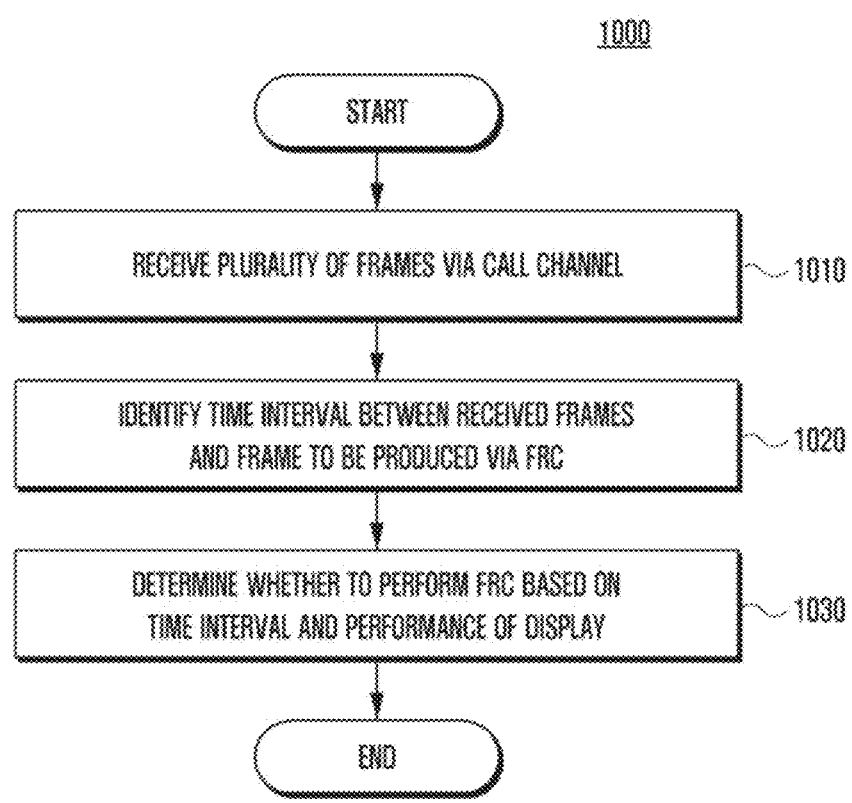
FIG. 10 is a flowchart illustrating an operation method of an electronic device according to an embodiment of the disclosure.

FIG. 10 is a flowchart illustrating an operation method 1000 of an electronic device according to an embodiment.

According to an embodiment of the disclosure, an electronic device (e.g., the electronic device 400 of FIG. 4) may receive packets corresponding to a plurality of frames that an external electronic device (e.g., the first electronic device 310 of FIG. 3) transmits via a call channel in operation 1010.

According to an embodiment of the disclosure, after receiving packets, the electronic device 400 may control a depacketizer (e.g., the depacketizer 322 of FIG. 3) so as to convert the received packets into a plurality of frames.

According to an embodiment of the disclosure, when performing FRC, the electronic device 400 may receive a plurality of packets at relatively short intervals due to various factors (e.g., deterioration of the quality of the network 330). If the electronic device 400 receives a plurality of packets at short intervals, the electronic device 400 may display a relatively large number of frames within a designated period of time. The electronic device 400 may perform FRC by inputting the received frames into the FRC module 325. In this instance, the display 430 may display a number of frames larger than a maximum number of frames that the display 430 is capable of displaying within the designated period of time.

According to an embodiment of the disclosure, in operation 1020, the electronic device 400 may identify a time interval between the received frames and/or the frames to be produced by the FRC module 325, before inputting, into the FRC module 325, the frames received from the external electronic device.

For example, given the situation of displaying 119 frames per second when the number of frames that the electronic device 400 has received is 60 per second and the number of frames to be produced by the FRC module 325 is 59 per second, the time interval between 119 frames may be 8.4 ms (1000/119 sec) (or 119 fps).

According to an embodiment of the disclosure, based on the time interval and the performance of the display 430, the electronic device 400 may determine whether to perform FRC on the received frames in operation 1030.

The performance of the display 430 may include the scanning rate of the display 430. According to an embodiment, based on the performance of the display 430 the processor 420 may identify whether the display 430 is capable of displaying all the received frames and the frames to be produced. If the scanning rate of the display 430 is 120 Hz, the display 430 may display 120 frames per second, and the display 430 may display one frame for each 8.3 ms.

The electronic device 400 may identify whether the time interval is greater than a designated value, and may determine to perform FRC on the received frames. By determining to perform FRC, the processor 420 may control the display 430 so as to display all the received frames and the frames produced by the FRC module 325. The designated value may be an interval (the minimum time during which one frame is capable of being displayed) corresponding to a scanning rate.

If performance of the display 430 is lower than that needed to display all the received frames and the frames to be produced, the electronic device 400 may not need to perform FRC. The electronic device 400 may identify that the time interval is less than a designated value, and may determine not to perform FRC on the received frames. By determining not to perform FRC, the electronic device 400 may control the display 430 to display only the received frames.

According to an embodiment of the disclosure, when not performing FRC, the electronic device 400 may identify whether the time interval between the received frames and the frames to be produced via FRC has changed to be greater than the interval corresponding to the scanning rate of the display, and may control the FRC module 325 to perform FRC again based on the result of the identification. For example, the electronic device 400 may identify that the time interval between received frames and frames to be produced via FRC has changed to be greater than the interval corresponding to the scanning rate, and may control the FRC module 325 to perform FRC using the received frames.

Figure 11:
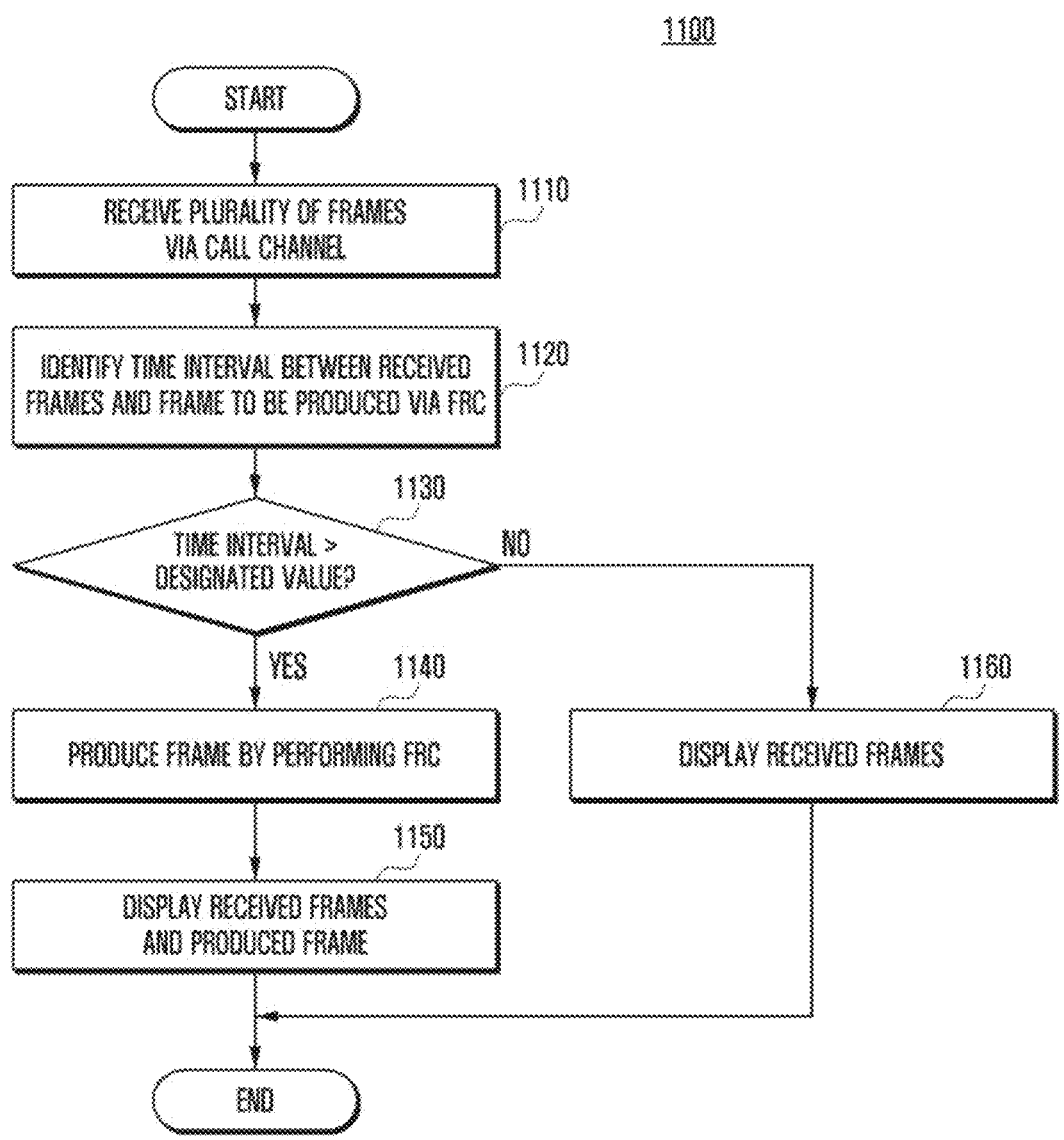
FIG. 11 is a flowchart illustrating an operation method of an electronic device according to an embodiment of the disclosure.

FIG. 11 is a flowchart illustrating an operation method 1100 of an electronic device according to an embodiment.

According to an embodiment of the disclosure, an electronic device (e.g., the electronic device 400 of FIG. 4) may receive packets corresponding to a plurality of frames that an external electronic device (e.g., the first electronic device 310 of FIG. 3) transmits via a call channel in operation 1110.

According to an embodiment of the disclosure, after receiving packets, the electronic device 400 may control a depacketizer (e.g., the depacketizer 322 of FIG. 3) so as to convert the received packets into a plurality of frames.

According to an embodiment of the disclosure, in the state of performing FRC, the electronic device 400 may receive a plurality of packets at relatively short intervals due to various factors (e.g., deterioration of the quality of the network 330). If the electronic device 400 receives a plurality of packets at short intervals, the electronic device 400 may display a relatively large number of frames within a designated period of time. The electronic device 400 may perform FRC by inputting the received frames into the FRC module 325. In this instance, the display 430 may display a number of frames larger than the maximum number of frames that the display 430 is capable of displaying within the designated period of time.

According to an embodiment of the disclosure, the electronic device 400 may identify the time interval between the received frames and/or frames to be produced by the FRC module 325, before inputting, into the FRC module 325, the frames obtained via conversion by the depacketizer in operation 1120.

According to an embodiment of the disclosure, the electronic device 400 may determine whether the identified time interval is greater than a designated value in operation 1130.

The designated value may be the interval (the minimum time during which one frame is capable of being displayed) corresponding to the scanning rate of the display.

According to an embodiment of the disclosure, in operation 1140, based on the fact that the identified time interval is greater than the designated value (operation 1130-YES), the electronic device 400 may perform FRC using the received frames, and may produce frame(s) to be displayed between the received frames.

According to an embodiment of the disclosure, the electronic device 400 may display the received frames and/or the produced frame in operation 1150.

According to an embodiment of the disclosure, in operation 1160, based on the fact that the identified time interval is less than the designated value (operation 1130-NO), the electronic device 400 may determine not to perform FRC, and may display the received frames.

If performance of the display 430 is lower than that is needed to display all the received frames and the frames to be produced, the electronic device 400 may not need to perform FRC. The electronic device 400 may identify that the time interval is less than the designated value, and may determine not to perform FRC on the received frames. By determining not to perform FRC, the electronic device 400 may control the display 430 to display only the received frames.

Figure 12:
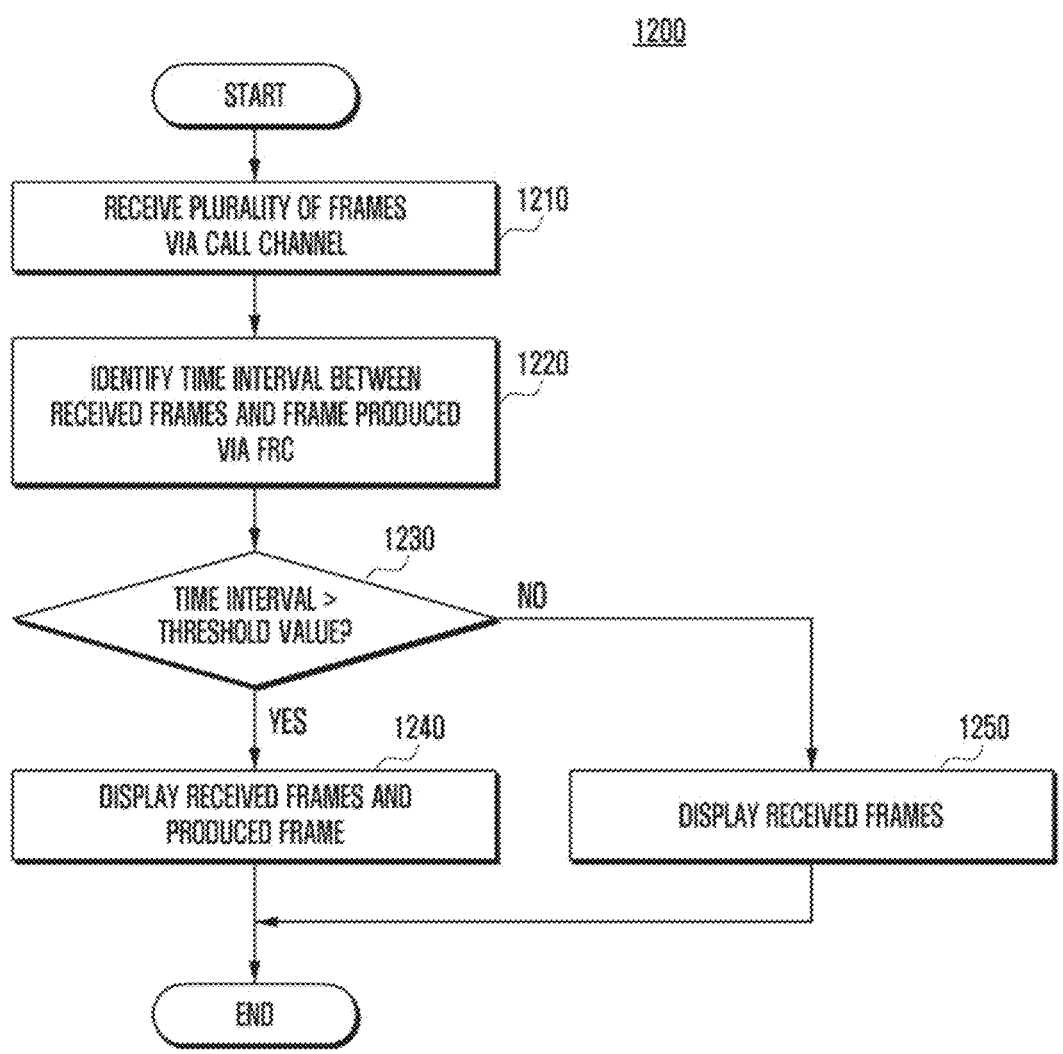
FIG. 12 is a flowchart illustrating an operation method of an electronic device according to an embodiment of the disclosure.

FIG. 12 is a flowchart illustrating an operation method 1200 of an electronic device according to an embodiment of the disclosure.

According to an embodiment of the disclosure, an electronic device (e.g., the electronic device 400 of FIG. 4) may receive packets corresponding to a plurality of frames that an external electronic device (e.g., the first electronic device 310 of FIG. 3) transmits via a call channel in operation 1210.

According to an embodiment of the disclosure, after receiving packets, the electronic device 400 may control a depacketizer (e.g., the depacketizer 322 of FIG. 3) so as to convert the received packets into a plurality of frames.

According to an embodiment of the disclosure, the electronic device 400 may control an FRC module (e.g., the FRC module 325 of FIG. 3) so as to produce frames to be displayed among the plurality of frames.

According to an embodiment of the disclosure, in the state of performing FRC, the electronic device 400 may receive a plurality of packets at relatively short intervals due to various factors (e.g., a change of the quality of the network 330). For example, when network quality improves after a period of deterioration, the electronic device 400 may receive a plurality of packets at short intervals. If the electronic device 400 receives a plurality of packets at short intervals, the electronic device 400 may display a relatively large number of frames within a designated period of time. The electronic device 400 may perform FRC by inputting the received frames into the FRC module 325. In this instance, the display 430 may display a number of frames larger than the maximum number of frames that the display 430 is capable of displaying within the designated period of time.

According to an embodiment of the disclosure, the electronic device 400 may identify the time interval between the received frames and the frames produced by FRC in operation 1220.

For example, when the number of frames that the electronic device 400 has received is 60 per second and the number of frames to be produced by the FRC module 325 is 59 per second, the required frame rate is 119 frames (or 119 fps) and the time interval between 119 frames may be 8.4 ms (1000/119 sec).

According to an embodiment of the disclosure, the electronic device 400 may determine whether to display the frames produced based on the time interval and the performance of the display 430.

The performance of the display 430 may include the scanning rate of the display 430. According to an embodiment, based on the performance of the display 430 the processor 420 may identify whether the display 430 is capable of displaying all the received frames and the frames to be produced. If the scanning rate of the display 430 is 120 Hz, the display 430 may display 120 frames per second, and the display 430 may display one frame every 8.3 ms. If the scanning rate of the display 430 is 60 Hz, the display 430 may display 60 frames per second, and the display 430 may display one frame every 16.6 ms.

According to an embodiment of the disclosure, the electronic device 400 may identify whether the identified time interval is greater than a designated value in operation 1230.

The designated value may be an interval (the minimum time during which one frame is capable of being displayed) corresponding to the scanning rate of the display.

According to an embodiment of the disclosure, in operation 1240, based on the fact that the identified time interval is greater than the designated value (operation 1230-YES), the electronic device 400 may display the received frames and the received frames.

According to an embodiment of the disclosure, in operation 1250, based on the fact that the identified time interval is less than the designated value (operation 1230-NO), the electronic device 400 may determine not to display the frames produced by the FRC module 325, and may display the received frames.

An operation method of an electronic device according to an embodiment of the disclosure may include an operation of receiving a plurality of frames via a call channel established via a call connection with an external electronic device; an operation of identifying a time interval between the plurality of frames and frames to be produced by performing frame rate conversion (FRC) based on the plurality of frames; and an operation of determining whether to perform the FRC based on the time interval and a performance of the display of the electronic device.

In the operation method of the electronic device according to an embodiment of the disclosure, the performance of the display may include the scanning rate of the display, and the operation of determining whether to perform the FRC may include an operation of determining to perform the FRC based on the time interval being greater than an interval corresponding to the scanning rate.

In the operation method of the electronic device according to an embodiment of the disclosure, the operation of determining whether to perform the FRC may include an operation of determining to refrain from performing the FRC based on the time interval being less than the interval corresponding to the scanning rate.

The operation method of the electronic device according to an embodiment of the disclosure may further include an operation of, while refraining from performing the FRC, starting to perform the FRC based on the time interval being greater than the interval corresponding to the scanning rate.

The operation method of the electronic device according to an embodiment of the disclosure may further include an operation of refraining from displaying at least one frame produced via the FRC based on the time interval being less than an interval corresponding to the scanning rate, while performing the FRC.

The operation method of the electronic device according to an embodiment of the disclosure may further include an operation of determining, based on a state of the electronic device, whether to stop the FRC in a state of performing the FRC.

In the operation method of the electronic device according to an embodiment of the disclosure, the state of the electronic device may include the temperature of the electronic device and/or the residual capacity of a battery of the electronic device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a communication circuit configured to transmit or receive data using a call channel established via a call connection with an external electronic device; and
a processor,
wherein the processor is configured to:
receive at least one of a first plurality of packets of a first frame via the call channel,
identify whether a lost packet is present in the first plurality of packets of the first frame based on reception of the at least one of the first plurality of packets via the call channel, and
determine, based on a result of the identification, whether to perform frame rate conversion (FRC) using at least the first frame,
wherein, based on identifying that the lost packet is present in the first plurality of packets, the processor is operable not to perform the FRC using the first frame.

2. The electronic device of claim 1, wherein, based on identifying that the lost packet is not present in the first plurality of packets, the processor is configured to perform the FRC using at least the first frame.

3. The electronic device of claim 1, wherein the processor is configured to display a frame corresponding to a packet received before the first frame until a second plurality of packets corresponding to a second frame are received.

4. The electronic device of claim 1, wherein, in a state of performing the FRC, the processor is configured to determine, based on a state of the electronic device, whether to stop the FRC.

5. The electronic device of claim 4, wherein the state of the electronic device comprises a temperature of the electronic device and/or a residual capacity of a battery of the electronic device.

6. An electronic device, comprising:
a display;
a communication circuit configured to transmit or receive data using a call channel established via a call connection with an external electronic device; and
a processor,
wherein the processor is configured to:
receive a plurality of frames via the call channel at respective times,
identify a time interval between frames including the received plurality of frames and frames to be produced by performing frame rate conversion (FRC) using the plurality of frames, and
determine whether to perform the FRC based on the time interval and a scanning rate of the display,
wherein the processor is further configured to refrain from performing the FRC using the received plurality of frames when the time interval is less than an interval corresponding to the scanning rate.

7. The electronic device of claim 6,
Wherein, based on the time interval being greater than the interval corresponding to the scanning rate, the processor is configured to perform the FRC using the received plurality of frames.

8. The electronic device of claim 6, wherein, while the processor is refraining from performing the FRC using the received plurality of frames, the processor is configured to start performing the FRC using the received plurality of frames based on the time interval being greater than the interval corresponding to the scanning rate.

9. The electronic device of claim 6, wherein, based on the time interval being less than the interval corresponding to a scanning rate, while the processor is performing the FRC using the received plurality of frames, the processor is configured to refrain from displaying at least one frame produced via the FRC using the received plurality of frames.

10. The electronic device of claim 6, wherein, in a state of performing the FRC, the processor is configured to determine, based on the state of the electronic device, whether to stop the FRC using the received plurality of frames.

11. The electronic device of claim 10, wherein the state of the electronic device comprises a temperature of the electronic device and/or a residual capacity of a battery of the electronic device.

12. An operation method of an electronic device, the method comprising:
receiving a plurality of frames via a call channel established via a call connection with an external electronic device at respective times;
identifying a time interval between frames including the received plurality of frames and frames to be produced by performing frame rate conversion (FRC) using the received plurality of frames; and
determining whether to perform the FRC based on the time interval and a scanning rate of a display of the electronic device,
wherein the determining whether to perform the FRC using the received plurality of frames comprises not performing the FRC using the received plurality of frames when the time interval is less than an interval corresponding to the scanning rate.

13. The method of claim 12,
wherein the determining whether to perform the FRC comprises determining to perform the FRC based on the time interval being greater than the interval corresponding to the scanning rate.

14. The method of claim 12, further comprising:
while refraining from performing the FRC using the received plurality of frames, starting to perform the FRC using the received plurality of frames based on the time interval being greater than the interval corresponding to the scanning rate.

15. The method of claim 12, further comprising:
based on the time interval being less than an interval corresponding to a scanning rate, while performing the FRC using the received plurality of frames, refraining from displaying at least one frame produced via the FRC using the received plurality of frames.

16. The method of claim 12, further comprising:
determining, based on a state of the electronic device, whether to stop the FRC using the received plurality of frames in a state of performing the FRC using the received plurality of frames.

17. The method of claim 16, wherein the state of the electronic device comprises a temperature of the electronic device and/or a residual capacity of a battery of the electronic device.

* * * * *